US011423382B2

(12) United States Patent
Gotanda et al.

(10) Patent No.: US 11,423,382 B2
(45) Date of Patent: Aug. 23, 2022

(54) REGISTRATION APPARATUS THAT DISPLAYS MONITORING SCREEN OF ONE OR MORE PAYMENTS APPARATUSES

(71) Applicant: TOSHIBA TEC KABUSHIKI KAISHA, Tokyo (JP)

(72) Inventors: Tsuyoshi Gotanda, Tokyo (JP); Jun Kikuchi, Shizuoka (JP); Akiko Susaki, Kanagawa (JP); Jun Miyazaki, Tokyo (JP); Jun Yoshitomi, Tokyo (JP); Shun Hashimoto, Fukuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 462 days.

(21) Appl. No.: 16/280,556

(22) Filed: Feb. 20, 2019

(65) Prior Publication Data
US 2019/0259010 A1 Aug. 22, 2019

(30) Foreign Application Priority Data
Feb. 22, 2018 (JP) .............................. JP2018-030118

(51) Int. Cl.
G06Q 20/20 (2012.01)
G07G 1/01 (2006.01)
G07G 1/00 (2006.01)

(52) U.S. Cl.
CPC ......... *G06Q 20/208* (2013.01); *G07G 1/0081* (2013.01); *G07G 1/01* (2013.01); *G07G 1/0009* (2013.01)

(58) Field of Classification Search
CPC ...... G07G 1/01; G07G 1/0009; G07G 1/0081; G06Q 20/202; G06Q 20/204; G06Q 20/208

(Continued)

(56) References Cited

U.S. PATENT DOCUMENTS 6,296,184 B1 * 10/2001 Dejaeger ................. A47F 9/047
235/383
2008/0061139 A1 * 3/2008 Roquemore ......... G07G 1/0054
235/383

(Continued)

FOREIGN PATENT DOCUMENTS

JP 2007095026 A * 4/2007
JP 2012-014740 A 1/2012

(Continued)

OTHER PUBLICATIONS

English equivalent translation of JP 2013242839, retrieved from European Patent Office on Apr. 8, 2021 (Year: 2021).*

(Continued)

*Primary Examiner* — Suezu Ellis
(74) *Attorney, Agent, or Firm* — Kim & Stewart LLP (57) ABSTRACT

A registration apparatus includes a scanner configured to optically read a product code from a product, a communication interface configured to communicate with one or more payment apparatuses associated with the registration apparatus, a display, and a processor. The processor is configured to control the communication interface to transmit registration data including data of one or more product codes read through the scanner for a transaction to a selected one of the one or more payment apparatuses, for processing payment for one or more products registered by the registration apparatus. The processor is also configured to control the display to display a monitoring screen indicating an operational state of a checkout process carried out by the selected one of the one or more payment apparatuses to which the registration data has been transmitted, based on information received from the selected one of the one or more payment apparatuses.

16 Claims, 5 Drawing Sheets

(58) Field of Classification Search
USPC .............................. 235/383; 705/16, 21, 23
See application file for complete search history.

(56) References Cited

U.S. PATENT DOCUMENTS

| | | | |
|---|---|---|---|
| 2010/0201779 A1* | 8/2010 | Inderrieden | G06Q 50/10 |
| | | | 348/14.01 |
| 2012/0197744 A1* | 8/2012 | Rose | G06Q 10/087 |
| | | | 705/17 |
| 2017/0017941 A1* | 1/2017 | Takahashi | G06Q 20/20 |
| 2017/0076260 A1* | 3/2017 | Ishikawa | G06Q 20/4014 |
| 2019/0251797 A1* | 8/2019 | Yajima | G07G 1/0018 |

FOREIGN PATENT DOCUMENTS

| | | | |
|---|---|---|---|
| JP | 2013242839 A | * | 12/2013 |
| JP | 2016-103189 A | | 6/2016 |
| JP | 2017-224363 A | | 12/2017 |

OTHER PUBLICATIONS

English equivalent translation of JP 2007095026, retrieved from European Patent Office on Apr. 10, 2021 (Year: 2021).*

Japanese Notice of Reasons for Refusal dated Aug. 31, 2021 in corresponding Japanese Patent Application No. 2018-030118, 6 pages (with Translation).

\* cited by examiner

REGISTRATION APPARATUS THAT DISPLAYS MONITORING SCREEN OF ONE OR MORE PAYMENTS APPARATUSES

CROSS-REFERENCE TO RELATED APPLICATION

This application is based upon and claims the benefit of priority from Japanese Patent Application No. 2018-030118, filed on Feb. 22, 2018, the entire contents of which are incorporated herein by reference.

FIELD

Embodiments described herein relate generally to a checkout system, a registration apparatus, and a checkout method using the same.

BACKGROUND

A self-service type or semi-self-service type checkout system is beneficial for saving labor cost for checkout in a retail store.

However, since the customers need to operate an apparatus on their own, it is common that a store clerk is assigned to deal with errors occurring in the use of the apparatus and monitor such an apparatus.

For these reasons, it is desirable that the customer can operate the checkout system without support of the store clerk, so that a workload on the store clerk is reduced.

DETAILED DESCRIPTION

In accordance with an embodiment, a registration apparatus includes a scanner configured to optically read a product code from a product, a communication interface configured to communicate with one or more payment apparatuses associated with the registration apparatus, a display, and a processor. The processor is configured to control the communication interface to transmit registration data including data of one or more product codes read through the scanner for a transaction to a selected one of the one or more payment apparatuses, for processing payment for one or more products registered by the registration apparatus. The processor is also configured to control the display to display a monitoring screen indicating an operational state of a checkout process carried out by the selected one of the one or more payment apparatuses to which the registration data has been transmitted, based on information received from the selected one of the one or more payment apparatuses.

An embodiment is described below with reference to the accompanying drawings. In the present embodiment, a registration apparatus used in a semi-self-service type checkout system is described as an example. In other words, in the present embodiment, a target transaction refers to sales of commodities. In the present embodiment, registration of a commodity to a list of commodities to be sold corresponds to registration of contents of the transaction.

Figure 1:
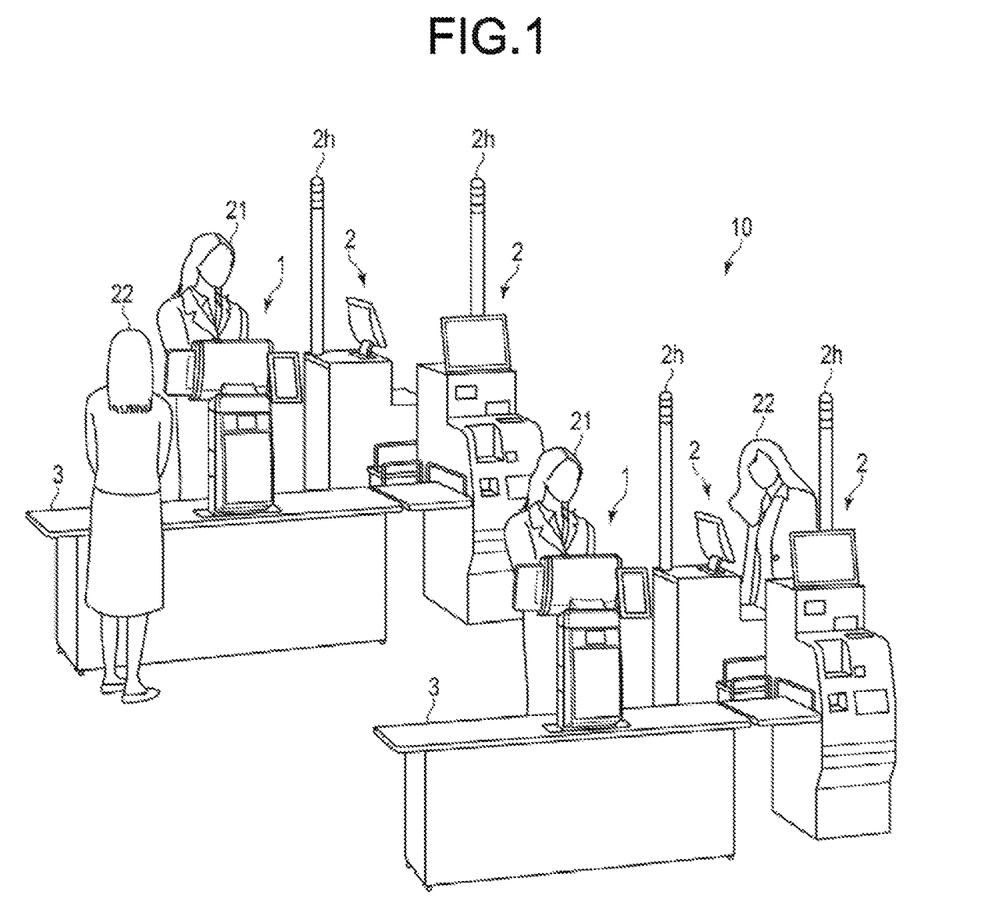
FIG. 1 illustrates a perspective view of a checkout system according to an embodiment.

FIG. 1 illustrates a perspective view of a checkout system 10 according to the present embodiment.

The checkout system 10 includes at least one registration apparatus 1 and at least one settlement apparatus 2 (or referred to as a payment apparatus). As shown in FIG. 1, the checkout system 10 includes two registration apparatuses 1 and four settlement apparatuses 2, and two settlement apparatuses are associated with one registration apparatus 1. The number of the registration apparatuses 1 and the number of the settlement apparatuses 2 are arbitrary, and a ratio of the number of the registration apparatuses 1 to the number of the settlement apparatuses 2 is arbitrary as well.

A store clerk 21 called a checker is an operator of the registration apparatus 1. A customer 22 who performs settlement of price relating to a truncation in the above-described retail store is an operator of the settlement apparatus 2. However, there is a case in which a part of the operations of the registration apparatus 1 is performed by the customer 22. There is also a case in which the settlement apparatus 2 is operated by the store clerk 21.

The registration apparatus 1 is disposed on a work table 3 in FIG. 1. By arranging a plurality of work tables 3, a plurality of checkout lanes is formed. In the vicinity of one end of the work table 3, for example, two settlement apparatuses 2 associated with the registration apparatus 1 on the work table 3 are arranged in a manner shown in FIG. 1. Thus, one registration apparatus 1 and two settlement apparatuses 2 are provided in one checkout lane.

The registration apparatus 1 registers a commodity to be purchased by the customer 22 who enters the passage as a purchased commodity. Thus, the registration apparatus 1 functions as a registration module for registering contents of a transaction. The registration apparatus 1 transmits settlement data for performing settlement of the price of the registered purchased commodity so that the settlement data can be processed by one of the settlement apparatuses 2 provided in the same checkout lane. Such an operation is equivalent to an operation of instructing the settlement apparatus to perform settlement of price relating to the transaction whose contents are registered. Thus, the registration apparatus 1 functions as an instruction module for issuing such an instruction.

The settlement apparatus 2 performs a settlement processing based on the settlement data if the settlement data transmitted from the registration apparatus 1 is received. The settlement apparatuses 2 may have the same configuration and perform the same settlement processing. The settlement apparatus 2 may also perform a processing of calculating an amount of the price to be settled through the settlement processing. The settlement apparatus 2 having such calculation processing function is also referred to as a checkout apparatus or a checkout machine. However, the calculation processing may be performed by the registration apparatus 1.

The transmission and reception of the settlement data between the registration apparatus 1 and the settlement apparatus 2 may be performed in any form. For example, when the registration apparatus 1 always transmits the settlement data to one predetermined settlement apparatus 2, and the settlement apparatus 2 can process the settlement data, the settlement processing based on the settlement data is performed. If the settlement apparatus 2 cannot perform the settlement processing, the settlement apparatus 2 transmits the received settlement data to another settlement apparatus 2. For example, the registration apparatus 1 may monitor operation status of the two settlement apparatuses 2 and transmit the settlement data to one of the settlement apparatuses 2 which does not execute the settlement processing. For example, the registration apparatus 1 may transmit the settlement data to both of the two settlement apparatus 2 simultaneously. Then, either one of the two settlement apparatuses 2 performs the settlement processing according to predetermined conditions. For example, the registration apparatus 1 may receive a request corresponding to an operation performed by the customer 22, and the registration apparatus 1 transmits the settlement data to the settlement apparatus 2 that transmitted the request. In any of the embodiments described above, the settlement data may be transmitted and received via another device such as a server device or the like.

Figure 2:
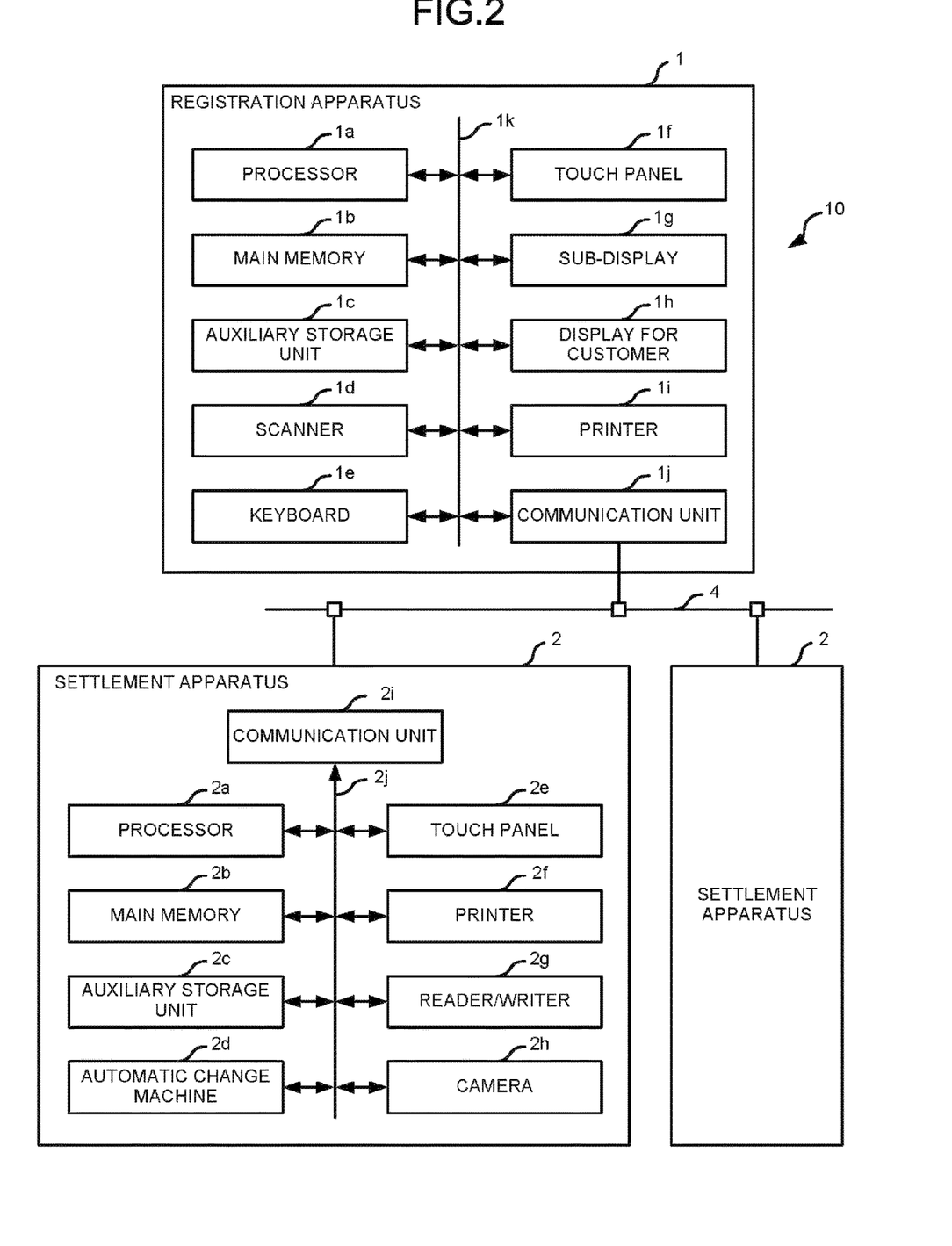
FIG. 2 is a block diagram illustrating a circuit configuration of main components of a registration apparatus and a settlement apparatus in FIG. 1.
Figure 3:
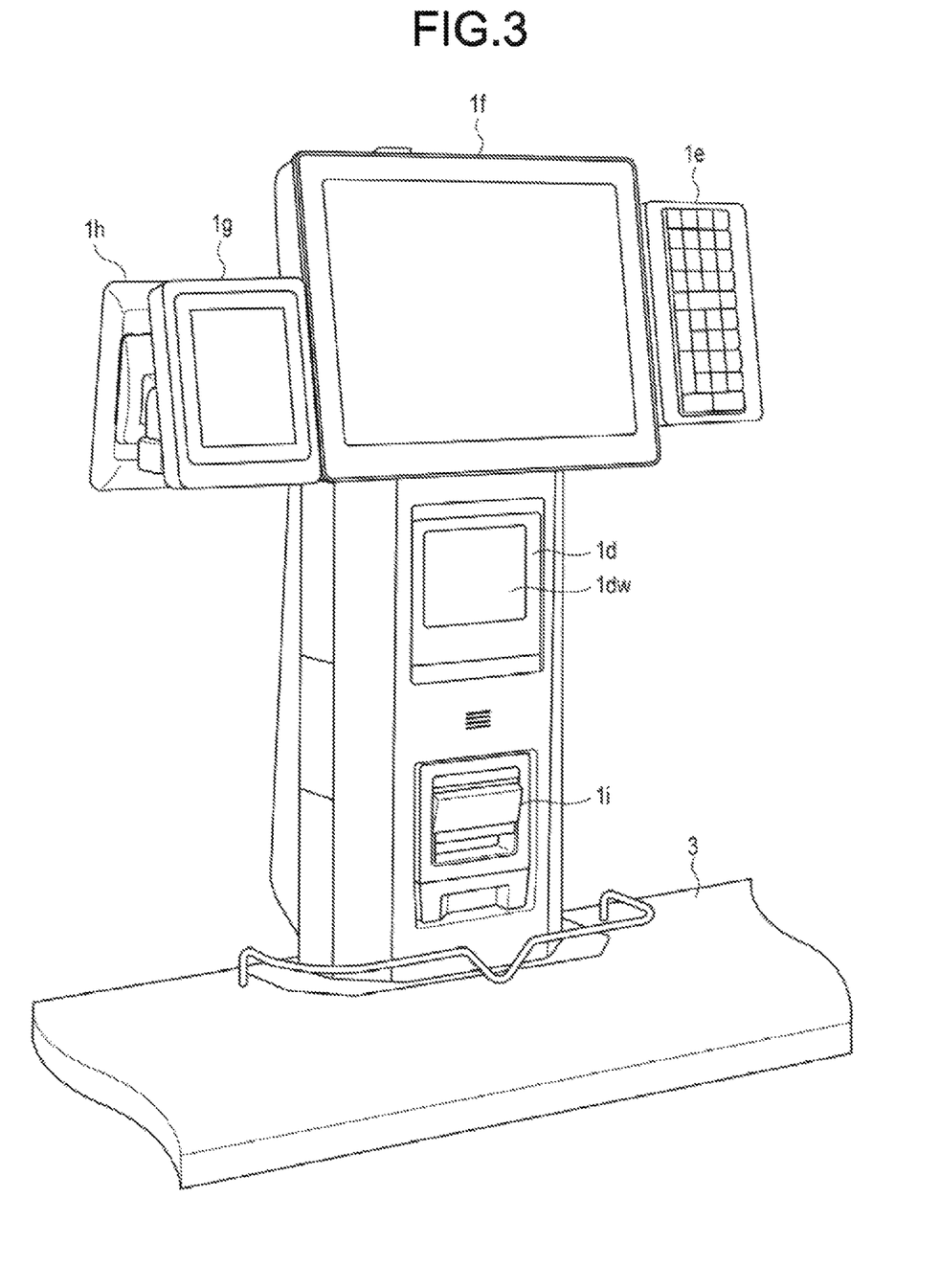
FIG. 3 illustrates a perspective view of an example of the registration apparatus in FIG. 1.

FIG. 2 is a block diagram illustrating a circuit configuration of main components of the registration apparatus 1 and the settlement apparatus 2. FIG. 3 illustrates a perspective view of an example of the registration apparatus 1. In FIG. 2 and FIG. 3, the same components are denoted with the same reference numerals. In FIG. 2, only one registration apparatus 1 and the two settlement apparatuses 2 associated with the registration apparatus 1 are shown. In FIG. 2, the circuit configuration of only one of the two settlement apparatuses 2 is shown.

Both the registration apparatus 1 and the settlement apparatus 2 are connected to an LAN (Local Area Network) 4. Instead of the LAN 4, another communication network such as the Internet may be used.

The registration apparatus 1 includes a processor 1a, a main memory 1b, an auxiliary storage unit 1c, a scanner 1d, a keyboard 1e, a touch panel 1f, a sub-display 1g, a display for customer 1h, a printer 1i, a communication unit 1j and a transmission path 1k.

In the registration apparatus 1, the processor 1a, the main memory 1b, and the auxiliary storage unit 1c are connected to each other via the transmission path 1k and serve as a computer that performs information processing for controlling the registration apparatus 1.

The processor 1a acts as a central functional module of the above-described computer. The processor 1a executes various information processing programs such as an operating system, a firmware, and application programs to control each module of the computer and perform various functions of the registration apparatus 1.

The main memory 1b acts as main memory of the above-described computer. The main memory 1b includes a nonvolatile memory area and a volatile memory area. The main memory 1b stores the above-described information processing programs in the nonvolatile memory area. The main memory 1b may store data required for the processor 1a to execute processing to control each module of the computer in the nonvolatile memory area or the volatile memory area. The main memory 1b uses the volatile memory area as a work area in which the data is appropriately rewritten by the processor 1a.

The auxiliary storage unit 1c acts as auxiliary storage of the above-described computer. The auxiliary storage unit 1c is, for example, an EEPROM (electric erasable programmable read-only memory), an HDD (hard disc drive), an SSD (solid state drive), or other storage devices. The auxiliary storage unit 1c stores data used by the processor 1a to perform various processing and data generated in a processing executed by the processor 1a. The auxiliary storage unit 1c may also store the above-described information processing programs.

The information processing programs stored in the main memory 1b or the auxiliary storage unit 1c include an information processing program for executing an information processing described below. For example, the registration apparatus 1 is accessed in a state in which the information processing program is stored in the main memory 1b or the auxiliary storage unit 1c. However, the hardware of the registration apparatus 1 may be released (distributed) in a state in which the above-described information processing program is not stored in the main memory 1b or the auxiliary storage unit 1c, or in a state in which another information processing program is stored in the main memory 1b or the auxiliary storage unit 1c. Then, in this case, the information processing program for executing the information processing described below may be released by being recorded in a removable recording medium or via the network to be written into the auxiliary storage unit 1c according to an instruction from a maintenance person. The removable recording medium may be a magnetic disk, a magneto-optical disk, an optical disk, a semiconductor memory or the like.

The scanner 1d photographs a commodity via a scanner window 1dw with a built-in camera and then identifies an optically readable code symbol such as a barcode or a two-dimensional code attached to the commodity through an image processing. Then, the scanner 1d outputs data indicated by the identified code symbol to the processor 1a. The scanner 1d may be other types of devices that utilize reflection of laser light to identify the code symbol. The scanner 1d may have a function of identifying a commodity using an object recognition technology based on characteristics of an image of the commodity. A scanner such as a hand-held type scanner may be provided in addition to the scanner 1d. There is also a case in which another scanner is provided but the scanner 1d is not provided.

The keyboard 1e includes a numeric keypad and a plurality of function keys. The keyboard 1e receives various instructions from an operator through key operation.

The touch panel 1f includes a display device and a touch sensor. The display device displays any screen such as a GUI (graphical user interface) screen under the control of the processor 1a. The display device may be, for example, a device such as a color LCD (liquid crystal display). The touch sensor is arranged by being superimposed on a display surface of the display device. The touch sensor detects a touch position of the operator on the display surface of the display device, and transmits the position information to the processor 1a. The touch sensor may be a known device. An operation surface of the touch panel 1f is directed to a location where the store clerk 21 who operates the registration apparatus 1 is present.

The sub-display 1g displays any screens such as first and second monitoring screens described below under the control of the processor 1a. The sub-display 1g may be, for example, a display device such as a color LCD. A display surface of the sub-display 1g is directed to a location where the store clerk 21 who operates the registration apparatus 1 is present. A touch panel may be used for the sub-display 1g.

The display for customer 1h is directed to a location where the customer 22 who is waiting for completion of a commodity registration processing is present. The display for customer 1h displays any screen for providing the customer 22 with any information under the control of the processor 1a. The screen displayed on the display for customer 1*h* is, for example, a screen showing a registration result or a screen showing promotion information. The display for customer 1*h* may be a known device such as a color LCD. The display for customer 1*h* may be a touch panel.

The printer 1*i* is, for example, a thermal printer or an impact dot printer, and issues a receipt by printing various character strings and images on a receipt paper.

The communication unit 1*j* performs communication via the LAN 4.

The transmission path 1*k* transmits data transmitted and received between the connected sections. The transmission path 1*k* may be a transmission path including various buses such as a system bus and various interface circuits for connecting these buses to respective sections.

The settlement apparatus 2 includes a processor 2*a*, a main memory 2*b*, an auxiliary storage unit 2*c*, an automatic change machine 2*d*, a touch panel 2*e*, a printer 2*f*, a reader/writer 2*g*, a camera 2*h*, a communication unit 2*i* and a transmission path 2*j*.

In the settlement apparatus 2, the processor 2*a*, the main memory 2*b* and the auxiliary storage unit 2*c* are connected to each other via the transmission path 2*j* to constitute a computer for performing an information processing for controlling the settlement apparatus 2.

The processor 2*a* acts as a central functional module of the above-described computer. The processor 2*a* executes various information processing programs such as an operating system, a firmware, and application programs to control each module of the computer and perform various functions of the settlement apparatus 2.

The main memory 2*b* acts as main memory of the above-described computer. The main memory 2*b* includes a nonvolatile memory area and a volatile memory area. The main memory 2*b* stores the above-described information processing programs in the nonvolatile memory area. The main memory 2*b* may store data required for the processor 2*a* to execute processing to control each module of the computer in the nonvolatile memory area or the volatile memory area. The main memory 2*b* uses the volatile memory area as a work area in which the data is appropriately rewritten by the processor 2*a*.

The auxiliary storage unit 2*c* acts as auxiliary storage of the above-described computer. The auxiliary storage unit 2*c* is, for example, an EEPROM, an HDD, an SSD, or other well-known storage devices. The auxiliary storage unit 2*c* stores data used by the processor 2*a* to perform various processing and data generated in a processing executed by the processor 2*a*. The auxiliary storage unit 2*c* may also store the above-described information processing programs.

The automatic change machine 2*d* receives coins and bills inserted. The automatic change machine 2*d* discharges coins and bills as change. In other words, the automatic change machine 2*d* has a function as a deposit and dispensing unit for depositing and dispensing cash.

The touch panel 2*e* includes a display device and a touch sensor. The display device displays any screen such as a GUI screen under the control of the processor 2*a*. The display device may be, for example, a known device such as a color LCD. The touch sensor is arranged by being superimposed on a display surface of the display device. The touch sensor detects a touch position of the operator on the display surface of the display device, and transmits the position information to the processor 2*a*. The touch sensor may be a known device.

The printer 2*f* is, for example, a thermal printer or an impact dot printer, and issues a receipt or a voucher by printing various character strings and images on a receipt paper.

The reader/writer 2*g* reads data recorded on a recording medium such as a card or an IC (integrated circuit) chip. The reader/writer 2*g* writes the data to the recording medium. The card may include various cards for recording information relating to a settlement processing, such as a membership card and a point card in addition to cards for settlement such as a credit card, a debit card, an electronic money card and a prepaid card. In addition to the various types of cards described above, the IC chip may be provided in an information terminal such as a smartphone. The reader/writer 2*g* may be a device of a magnetic type, a contact type, or a non-contact type, or may include a plurality of types of devices.

The camera 2*h* is mounted, for example, at a position shown in FIG. 1 and photographs an image in a range including the operation surface of the settlement apparatus 2 and the periphery thereof from the above. In other words, the camera 2*h* photographs an operation status of the settlement apparatus 2. The camera 2*h* may be an existing image capturing device such as an image capturing device for capturing moving images or an image capturing device for intermittently capturing a still image.

The communication unit 2*i* performs communication via the LAN 4.

The transmission path 2*j* transmits data transmitted and received between the connected sections. The transmission path 2*j* may be a known transmission path including various buses such as a system bus and various interface circuits for connecting these buses and respective sections.

The hardware of the settlement apparatus 2 may be, for example, an existing settlement apparatus used in an existing semi-self-service type checkout system.

Next, the operation of the checkout system 10 having the above-described configuration is described by mainly focusing on the operation of the registration apparatus 1.

The checkout system 10 performs various functions performable by another existing checkout system in the same manner as the existing checkout system. The registration processing by the registration apparatus 1 and the settlement processing by the settlement apparatus 2 are performed in the same manner as the existing checkout system as well. At this time, the processor 1*a* mainly displays a screen for providing various kinds of information to the store clerk 21 who operates the registration apparatus 1 on the touch panel 1*f*. In other words, the processor 1*a* enables the touch panel 1*f*, which is an example of a first display device, to display the screen as a first screen relating to the operation for registration performed by the store clerk 21. Thus, the computer having the processor 1*a* as the central functional module functions as a first control module for performing such control. Then, the store clerk 21 appropriately performs operations on the keyboard 1*e* and the touch panel 1*f* and an operation for holding a commodity over the scanner 1*d* while confirming the display on the touch panel 1*f* as necessary, thereby registering the commodity purchased by the customer 22.

In the registration apparatus 1, the processor 1*a* executes information processing for displaying a monitoring screen as processing in a thread different from that for performing the registration processing. The monitoring screen is used for the store clerk 21 who operates the registration apparatus 1 to confirm an operation status of the settlement apparatus 2.

Figure 4:
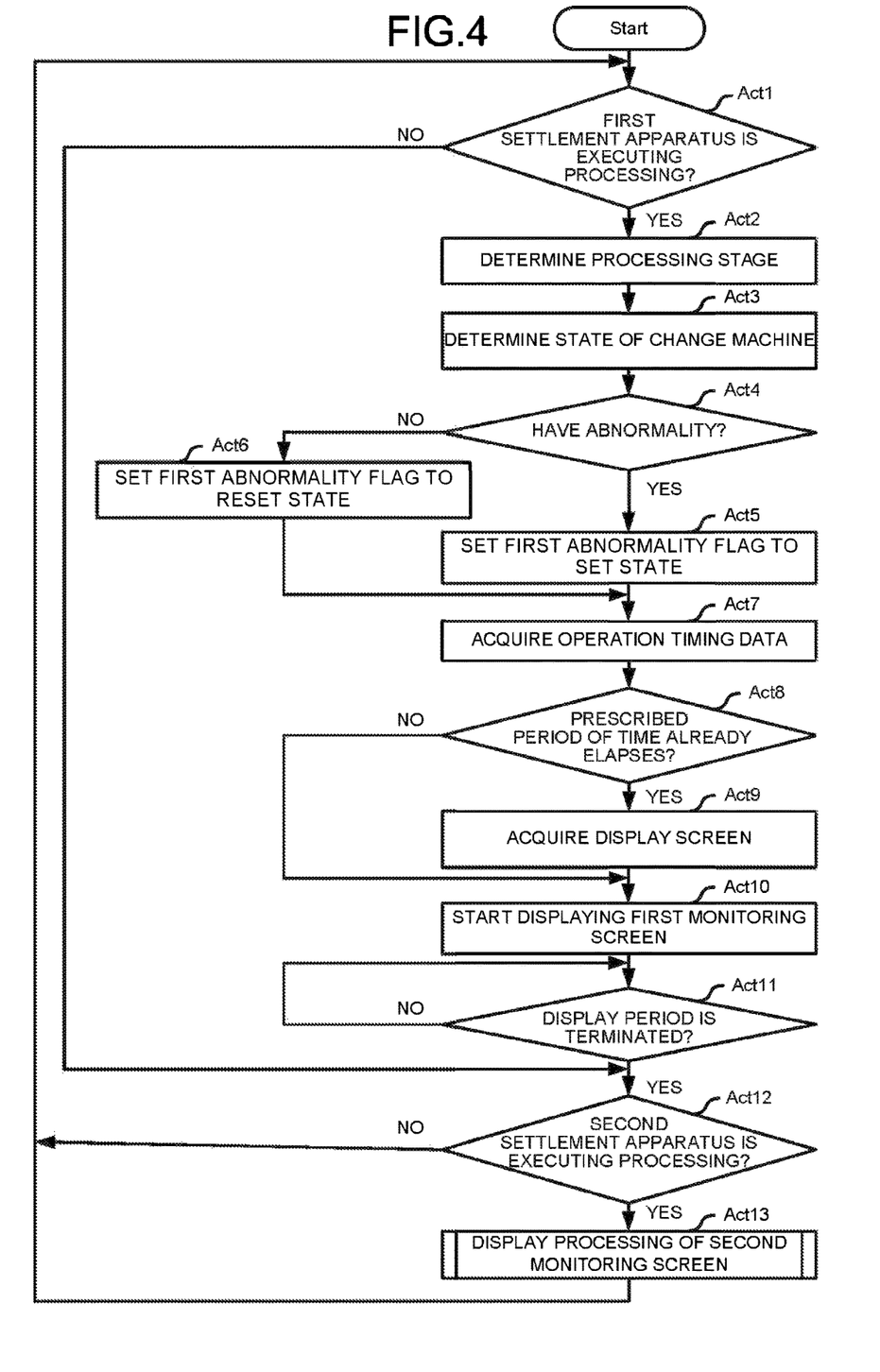
FIG. 4 is a flowchart depicting a processing procedure of information processing for displaying a monitoring screen.

FIG. 4 is a flowchart depicting a processing procedure of the information processing for displaying the monitoring screen performed by the processor 1a. The processor 1a executes the information processing by executing the information processing program stored in the main memory 1b or the auxiliary storage unit 1c.

In Act 1, the processor 1a determines whether or not the predetermined one settlement apparatus 2 (hereinafter, referred to as a "first settlement apparatus 2") among the associated two settlement apparatuses 2 is carrying out the settlement processing. Then, the processor 1a determines Yes if the first settlement apparatus 2 is carrying out the settlement processing, and the process proceeds to Act 2.

In Act 2, the processor 1a determines the current processing stage of the first settlement apparatus 2. Here, the processing stage refers to a period obtained by dividing a period in which the settlement processing is performed into several processing periods. The method for determining the processing stage is arbitrarily set, and is determined by a creator of the information processing program, for example.

For example, the processing stage is defined as "reception of settlement data", "waiting for designation of settlement method", "acquisition of settlement data", "settlement", "issuance of receipt", and the like. The "reception of settlement data" is a processing period for receiving settlement data to be processed. The "waiting for designation of settlement method" is a processing period for receiving designation of the settlement method by the customer 22 from a plurality of settlement methods applicable to the settlement apparatus 2 such as cash settlement, credit settlement, electronic money settlement, etc. The "acquisition of settlement data" is a processing period for acquiring the settlement data necessary for executing the settlement. In the case of the cash settlement, the settlement data refers to data indicating a deposit amount of cash. In the case of the credit settlement, the settlement data refers to data indicating a card number recorded on the credit card. The "settlement" is processing of actually paying the settlement amount using the acquired settlement data. In the case of the cash settlement, in "settlement", processing for deducting the settlement amount from the deposit amount and dispensing a change as necessary is performed. In the case of credit settlement, in "settlement", processing of issuing settlement request to a credit server together with notification such as the card number and the settlement amount and receiving a settlement result from the credit server is performed. The "issuance of receipt" is processing for issuing a receipt showing a list of commodities and the settlement result.

For example, the processor 1a makes an inquiry to the processor 2a of the first settlement apparatus 2 and receives a report of the processing stage as a response from the processor 2a to determine the processing stage thereof.

In Act 3, the processor 1a determines the state of the automatic change machine 2d provided in the first settlement apparatus 2. Specifically, for example, the processor 1a determines whether or not an abnormality occurs in the automatic change machine 2d. The abnormality of the automatic change machine 2d includes, for example, that the money is clogged, that the money is empty, that the money is full, that the amount of remaining money is small, that the remaining space of a storage of the money is small, or the like. The processor 1a acquires status data indicating the above-described various abnormalities managed by the automatic change machine 2d to determine the state of the automatic change machine 2d. The status data may be transmitted to the registration apparatus 1 by a processor provided in the automatic change machine 2d or may be obtained from the automatic change machine 2d by the processor 2a and then transmitted to the registration apparatus 1.

In Act 4, the processor 1a determines whether or not the abnormality occurs in the automatic change machine 2d. If the abnormality occurs, the processor 1a determines Yes and the process proceeds to Act 5.

In Act 5, the processor 1a sets a state of a first abnormality flag to a set state. The first abnormality flag is, for example, 1-bit data stored in the main memory 1b, and when it is in the set state, the first abnormality flag indicates that the abnormality occurs in the automatic change machine 2d in the first settlement apparatus 2. After that, the process proceeds to Act 7.

On the other hand, if no abnormality occurs in the automatic change machine 2d, the processor 1a determines No in Act 4 and the process proceeds to Act 6.

In Act 6, the processor 1a sets the state of the first abnormality flag to a reset state. The process then proceeds to Act 7.

In Act 7, the processor 1a acquires operation timing data from the first settlement apparatus 2. According to the operation timing data, a timing at which operation on the first settlement apparatus 2 performed by the operator is most recently performed can be determined. The operation timing data may indicate a time at which operation on the first settlement apparatus 2 performed by the operator is most recently performed or may indicate elapsed period of time since the corresponding operation is performed. In the settlement apparatus 2, the processor 2a records a timing at which the operation on the touch panel 2e is most recently performed, and transmits the operation timing data indicating the timing to the registration apparatus 1.

In Act 8, the processor 1a determines whether or not a prescribed period of time elapses since the operation on the first settlement apparatus 2 performed by the operator is most recently performed. If the prescribed period of time elapses, the processor 1a determines Yes, and the process proceeds to Act 9.

In Act 9, the processor 1a acquires a screen displayed on the touch panel 2e of the first settlement apparatus 2. Specifically, the processor 1a requests the first settlement apparatus 2 to transmit the screen. If the request is received, the processor 2a of the first settlement apparatus 2 transmits data indicating the screen being displayed on the touch panel 2e to the registration apparatus 1. After that, the process proceeds to Act 10. If the prescribed period of time does not elapse since the operation on the first settlement apparatus 2 performed by the operator is most recently performed, the processor 1a determines No in Act 8, the process passes Act 9 and proceeds to Act 10.

In Act 10, the processor 1a starts the display on the sub-display 1g of the first monitoring screen.

Figure 5:
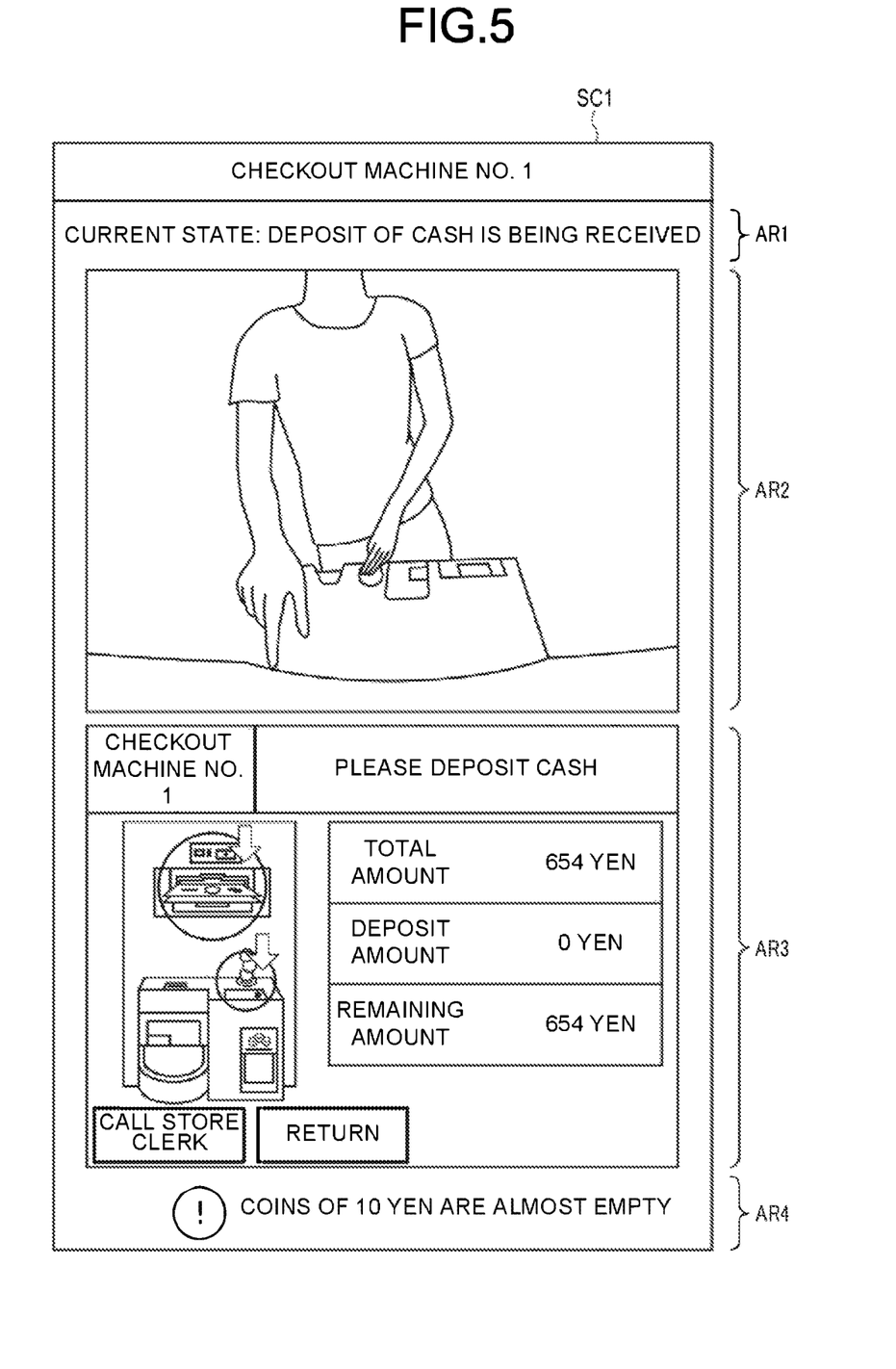
FIG. 5 illustrates a first monitoring screen as an example.

FIG. 5 shows a first monitoring screen SC1 as an example.

The first monitoring screen SC1 is shown when the name of the first settlement apparatus 2 is "checkout machine No. 1". In the first monitoring screen SC1, areas AR1, AR2, AR3, and AR4 are arranged in a vertical direction side by side.

The processor 1a shows the processing stage of the first settlement apparatus 2 using a character string in the area AR1. In FIG. 5, a case in which the processing stage is the "acquisition of settlement data" is shown. In FIG. 5, the "cash settlement" is selected as the settlement method. Therefore, in the processing stage of the "acquisition of settlement data", the deposit of cash is received in the automatic change machine 2d. Therefore, in the area AR1, the "deposit of cash is being received" is shown as the current state. The information shown in the area AR1 for each processing stage is arbitrary, and is determined by, for example, the creator of the information processing program.

The processor 1a shows the image obtained by the camera 2h of the first settlement apparatus 2 in the area AR2. For example, if the camera 2h captures the moving images, the processor 1a acquires the moving images from the first settlement apparatus 2 in real time and displays the moving images as an animation in the area AR2. For example, if the camera 2h intermittently captures still images, the processor 1a sequentially acquires the intermittently captured still images from the first settlement apparatus 2, and displays the still images in a slide show format in the area AR2. Specifically, the processor 1a requests the first settlement apparatus 2 to start transmitting the image captured by the camera. If the transmission start request is received, the processor 2a of the settlement apparatus 2 starts streaming transmission of data indicating the moving images to the registration apparatus 1 when the camera 2h captures the moving images. When the camera 2h intermittently captures still images, the processor 2a transmits data indicating a still image to the registration apparatus 1 every time the camera 2h captures the still image. The processor 1a receives the data transmitted as described and synthetizes the image indicated by the data in the area AR2.

In the area AR3, the processor 1a shows the display screen acquired in Act 9. When the processor 1a passes the processing in Act 9 because No is determined in Act 8, the processor 1a sets the area AR3 to a blank state or shows a default image. At this time, the image displayed in the area AR3 is arbitrary, and is determined by, for example, the creator of the information processing program.

In the area AR4, when the first abnormality flag is in the set state, the processor 1a operates to show the type of occurring abnormality as a character string. In FIG. 5, the remaining amount of coins of 10 Yen is small. When the first abnormality flag is in the reset state, the processor 1a sets the area AR4 to the blank state, or operates to show a predetermined character string or image. At this time, the type of the information displayed in the area AR4 is arbitrary, and is determined by, for example, the creator of the information processing program. For example, it is possible to show a character string such as "the change machine is normal" in the area AR4.

In Act 11, the processor 1a stands by until the predetermined display period passes in a state in which the first monitoring screen SC1 is displayed. What period the display period is set is arbitrary, and is determined by, for example, the creator of the information processing program. The display period may be arbitrarily set by an administrator of the registration apparatus 1. For example, the display period is a period until a predetermined period of time elapses, for example, in about several seconds since the display of the first monitoring screen is started in Act 10. Alternatively, the display period may be a period until a predetermined termination instruction is issued by an operation on the keyboard 1e or the touch panel 1f. Then, if the display period is terminated, the processor 1a determines Yes, and the process proceeds to Act 12. If the first settlement apparatus 2 is not executing the settlement processing, the processor 1a determines No in Act 1, and the process passes Act 2 to Act 11, and proceeds to Act 12.

In Act 12, the processor 1a determines whether or not a settlement apparatus 2 (hereinafter referred to as a "second settlement apparatus 2") different from the first settlement apparatus 2 among the two settlement apparatuses 2 associated with the registration apparatus 1 is executing the settlement processing. Then, if the second settlement apparatus 2 is executing the settlement processing, the processor 1a determines Yes and the process proceeds to Act 13. If the second settlement apparatus 2 is not executing the settlement processing, the processor 1a determines No and the process returns Act 1. Thus, if neither the first settlement apparatus 2 nor the second settlement apparatus 2 is executing the settlement processing, the processor 1a stands by until one of the settlement apparatuses 2 starts the settlement processing in Act 1 and Act 12. The processor 1a repeats the processing in Act 2 to Act 11 if only the settlement processing by the first settlement apparatus 2 is continued. As a result, the first monitoring screen is being updated as necessary and meanwhile, is subsequently displayed on the sub-display 1g.

In Act 13, the processor 1a performs processing for displaying the second monitoring screen. Specifically, the processor 1a executes the same processing as that in Act 2-Act 11 on the second settlement apparatus 2. However, as the processing equivalent to that in Act 5 and Act 6, the processor 1a sets a second abnormality flag to a set or a reset state. As the processing equivalent to that in Act 10, the processor 1a starts displaying the second monitoring screen showing information relating to the second settlement apparatus 2 in the same format as the first monitoring screen SC1.

If the processor 1a determines Yes in the processing equivalent to that in Act 11 in Act 13, the processor 1a terminates the processing in Act 13 and the process returns to Act 1. Thus, if the first settlement apparatus 2 is executing the settlement processing, the processor 1a executes the processing subsequent to Act 2 to display the first monitoring screen instead of the second monitoring screen. In other words, if both the first settlement apparatus 2 and the second settlement apparatus 2 are executing the settlement processing, the processor 1a alternately executes the processing in Act 2 to Act 11 and the processing in Act 13. As a result, the first monitoring screen and the second monitoring screen are alternately displayed on the sub-display 1g. In this case, if one of the settlement apparatuses 2 is requested to start transmitting the image captured by the camera in Act 10 or Act 13 equivalent thereto, the processor 1a requests the other settlement apparatus 2 to stop the transmission. The processor 2a of the settlement apparatus 2 requested to stop the transmission stops transmitting the image captured until then.

If only the settlement processing performed by the second settlement apparatus 2 is continued, the processor 1a repeats the processing in Act 13 without executing the processing in Act 2 to Act 11. As a result, the second monitoring screen is updated as necessary, and meanwhile, is subsequently displayed on the sub-display 1g.

The first and second monitoring screens are used for the store clerk 21 to conf21irm an operation status of the settlement apparatus 2 that the customer 22 operates. The customer 22, the settlement apparatus 2 and the store clerk 21 correspond to the second operator, the other apparatus and the first operator, respectively, and the first and second monitoring screens are examples of second screens. The sub-display 1g is an example of a second display device. Thus, the information processing based on the information processing program is executed by the processor 1a, and in this way, the computer having the processor 1a as the central functional module functions as a second control module for displaying the second screen on the second display device.

As described above, according to the registration apparatus 1, the store clerk 21 can confirm the operation statuses of the first and second settlement apparatuses 2 with the first and second monitoring screens displayed on the sub-display 1g while confirming the information relating to the registration processing using the touch panel 1f. Then, when a trouble occurs in the two settlement apparatuses 2 associated with the registration apparatus 1 operated by the store clerk 21, the store clerk 21 can confirm the situation such as the trouble from the first or second monitoring screen, and can take measures as necessary. As a result, there is no need to allocate the store clerk 21 who mainly takes in charge of monitoring the settlement apparatus 2, or it is possible to reduce the burden on such store clerk 21. Even when the store clerk 21 who mainly takes in charge of monitoring the settlement apparatus 2 is allocated, since the trouble or the like occurring when the store clerk 21 is busy can be handled instead of the store clerk 21 who operates the registration apparatus 1, it is possible to prevent the trouble or the like from being left unattended.

According to the registration apparatus 1, the first monitoring screen and the second monitoring screen are alternately displayed on the sub-display 1g. Thus, it is possible to display the operation status of one settlement apparatus 2 in detail using most of the display area of the sub-display 1g. Then, the store clerk 21 can confirm the operation status of each of the first and second settlement apparatuses 2 associated with the registration apparatus 1.

According to the registration apparatus 1, in the first and second monitoring screens, the processing stage of the settlement apparatus 2 is shown. Thus, by observing the first and second monitoring screens, the store clerk 21 can recognize the progress of the settlement processing in the settlement apparatus 2. Thus, the store clerk 21 can recognize a situation where the customer 22 is puzzled by the operation of the settlement apparatus 2.

According to the registration apparatus 1, an image obtained by photographing a state in which the customer 22 is operating the settlement apparatus 2 is shown in the first and second monitoring screens. Thus, the store clerk 21 can directly confirm the behavior of the customer 22 by observing the first and second monitoring screens. Then, the store clerk 21 can take appropriate measures for the customer 22 who is puzzled by the operation.

According to the registration apparatus 1, the screen displayed on the touch panel 2e of the settlement apparatus 2 is shown in the first and second monitoring screens. Thus, the store clerk 21 can confirm a state of the settlement apparatus 2 indicating what kind of operation the customer should perform by observing the first and second monitoring screens. Then, the store clerk 21 can properly guide the operation for the customer 22.

According to the registration apparatus 1, the screen on the touch panel 2e of the settlement apparatus 2 is displayed on the first and second monitoring screens only when the operator does not perform an operation over the prescribed period of time. In other words, if the customer 22 performs the operations sequentially within the prescribed period of time, the screen displayed on the touch panel 2e of the settlement apparatus 2 is not displayed on the first and second monitoring screens. Accordingly, when there is a possibility that the operator is puzzled by the operation, the store clerk 21 can easily recognize that the operator is puzzled by confirming that the screen displayed on the touch panel 2e of the settlement apparatus 2 is displayed on the first and second monitoring screens. As a result, the store clerk 21 can accurately determine whether to guide the operation for the customer 22.

According to the registration apparatus 1, an abnormality occurring in the automatic change machine 2d of the settlement apparatus 2 is shown in the first and second monitoring screens. In this way, the store clerk 21 can confirm the operation status of the automatic change machine 2d by observing the first and second monitoring screens. As a result, the store clerk 21 can quickly maintain the automatic change machine 2d such as replenishing money as necessary.

According to the registration apparatus 1, a monitoring screen relating to the settlement apparatus 2 that is performing the settlement processing is displayed on the sub-display 1g. Therefore, when only one of the settlement apparatuses 2 is performing the settlement processing, it is possible to enable the store clerk 21 to confirm the operation status of the settlement apparatus 2 intensively. As a result, it is possible to promptly guide the customer 22.

The present embodiment may be modified as follows.

In a face-to-face type POS (point-of-sale) terminal, the same display as that in the above-described embodiment may be performed to enable an operator of the POS terminal to confirm an operation status of the self-service type POS terminal or the settlement apparatus in a semi-self-service system.

The information displayed on the first monitoring screen and the second monitoring screen does not necessarily include all of the four types of information described in the above embodiment and may not include a part of the information. The first monitoring screen and the second monitoring screen may show information different from the four types described in the above embodiment. In this case, all of the four types of information described in the above embodiment may not be displayed on the first monitoring screen and the second monitoring screen.

The first monitoring screen and the second monitoring screen may be simultaneously displayed on the sub-display 1g side by side.

The display of the first monitoring screen and the display of the second monitoring screen may be switched in response to an instruction from the operator.

The forms of the first monitoring screen and the second monitoring screen may be different from each other.

Three or more settlement apparatuses 2 may be associated with one registration apparatus 1. In this case, the processor 1a may generate a monitoring screen relating to each of three or more of the settlement apparatuses 2 associated therewith, and display the monitoring screens on the sub-display 1g.

A monitoring screen relating to the settlement apparatus 2 that is not performing the settlement processing may be displayed on the sub-display 1g. By doing this, the store clerk 21 can confirm the status of the settlement apparatus 2 when he/she is not busy to efficiently perform work such as replenishing money, for example.

The transaction whose contents are registered in the registration apparatus 1 may be a transaction other than commodity sales such as provision of service, for example.

Each function performed by the processor 1a by performing information processing can be partly or entirely performed by hardware that executes information processing not based on a program, such as a logic circuit or the like. Each of the above-described functions can also be performed by a combination of software control with hardware such as the above logic circuit.

While certain embodiments have been described, these embodiments have been presented by way of example only, and are not intended to limit the scope of the invention.

Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A checkout system comprising a registration apparatus and first and second payment apparatuses associated with the registration apparatus, wherein
each of the first and second payment apparatuses is configured to process payment for one or more products registered by the registration apparatus, and
the registration apparatus comprises:
a scanner configured to optically read a product code from a product;
a communication interface configured to communicate with the first and second payment apparatuses;
a display; and
a processor configured to:
control the communication interface to transmit registration data including data of one or more product codes read through the scanner for a transaction to the first payment apparatus;
based on information received from the first payment apparatus, control the display to display a first monitoring screen indicating an operational state of a checkout process carried out by the first payment apparatus to which the registration data has been transmitted, wherein the first monitoring screen includes a status region presenting a current user interface displayed on a display of the first payment apparatus;
determine whether a display period of the first monitoring screen reached a predetermined display period and whether the second payment apparatus is in process; and
upon determining that the display period of the first monitoring screen reached the predetermined display period and that the second payment apparatus is in process, control the display to display a second monitoring screen indicating an operational state of a checkout process carried out by the second payment apparatus.

2. The checkout system according to claim 1, wherein the first monitoring screen also includes a status region indicating one of a plurality of predetermined checkout stages as a current checkout stage of the first payment apparatus.

3. The checkout system according to claim 1, wherein the first monitoring screen also includes a status region indicating a current error state of a cash dispenser of the first payment apparatus.

4. The checkout system according to claim 1, wherein the first monitoring screen also includes a status region presenting a current image of an operator of the first payment apparatus, the current image being captured by a camera of the first payment apparatus.

5. The checkout system according to claim 4, wherein the current image of the operator is a streamed video image.

6. The checkout system according to claim 1, wherein the processor of the registration apparatus is further configured to determine whether a non-operation time period of the first payment apparatus, during which no operation is made by an operator thereof, reached a threshold, and obtain data of the current user interface upon determining that the non-operation time period reached the threshold.

7. The checkout system according to claim 1, wherein the registration apparatus further includes a second display, and the processor of the registration apparatus is further configured to control the second display to display an operation screen to operate the registration apparatus.

8. The checkout system according to claim 1, wherein the first monitoring screen is not displayed on the display while the second monitoring screen is displayed on the display.

9. A registration apparatus comprising:
a scanner configured to optically read a product code from a product;
a communication interface configured to communicate with first and second payment apparatuses associated with the registration apparatus;
a display; and
a processor configured to:
control the communication interface to transmit registration data including data of one or more product codes read through the scanner for a transaction to the payment apparatus, for processing payment for one or more products registered by the registration apparatus; and
based on information received from the first payment apparatus, control the display to display a first monitoring screen indicating an operational state of a checkout process carried out by the first payment apparatus to which the registration data has been transmitted, wherein the first monitoring screen includes a status region presenting a current user interface displayed on a display of the first payment apparatus;
determine whether a display period of the first monitoring screen reached a predetermined display period and whether the second payment apparatus is in process; and
upon determining that the display period of the first monitoring screen reached the predetermined display period and that the second payment apparatus is in process, control the display to display a second monitoring screen indicating an operational state of a checkout process carried out by the second payment apparatus.

10. The registration apparatus according to claim 9, wherein the first monitoring screen also includes a status region indicating one of a plurality of predetermined checkout stages as a current checkout stage of the first payment apparatus.

11. The registration apparatus according to claim 9, wherein the first monitoring screen also includes a status region indicating a current error state of a cash dispenser of the first payment apparatus.

12. The registration apparatus according to claim 9, wherein the first monitoring screen also includes a status region presenting a current image of an operator of the first payment apparatus, the current image being captured by a camera of the first payment apparatus.

13. A checkout method using a checkout system including a registration apparatus and first and second payment apparatuses associated with the registration apparatus, the method comprising:
optically reading a product code from each of one or more products using a scanner of the registration apparatus;

transmitting registration data including data of the one or more product codes read through the scanner for a transaction from the registration apparatus to the first payment apparatus;

based on information received from the first payment apparatus, displaying, on a display of the registration apparatus, a first monitoring screen indicating an operational state of a checkout process carried out by the first payment apparatus to which the registration data has been transmitted, wherein the first monitoring screen includes a status region presenting a current user interface displayed on a display of selected one of the one or more payment apparatuses;

determining whether a display period of the first monitoring screen reached a predetermined display period and whether the second payment apparatus is in process; and upon determining that the display period of the first monitoring screen reached the predetermined display period and that the second payment apparatus is in process, displaying, on the display, a second monitoring screen indicating an operational state of a checkout process carried out by the second payment apparatus.

14. The checkout method according to claim 13, wherein the first monitoring screen also includes a status region indicating one of a plurality of predetermined checkout stages as a current checkout stage of the first payment apparatus.

15. The checkout method according to claim 13, wherein the first monitoring screen also includes a status region indicating a current error state of a cash dispenser of the first payment apparatus.

16. The checkout method according to claim 13, wherein the first monitoring screen also includes a status region presenting a current image of an operator of the first payment apparatus, the current image being captured by a camera of the first payment apparatus.

* * * * *